(12) United States Patent
Dai et al.

(10) Patent No.: US 8,527,925 B2
(45) Date of Patent: Sep. 3, 2013

(54) ESTIMATING CLOCK SKEW

(75) Inventors: Hong Wei Dai, Shanghai (CN); Gong Qiong Li, Shanghai (CN); Jia Niu, Shanghai (CN); Jun Tan, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/463,857

(22) Filed: May 4, 2012

(65) Prior Publication Data
US 2013/0055007 A1 Feb. 28, 2013

(30) Foreign Application Priority Data

Aug. 30, 2011 (CN) .......................... 2011 1 0254111

(51) Int. Cl.
*G06F 17/50* (2006.01)

(52) U.S. Cl.
USPC .......................................... 716/108; 716/106

(58) Field of Classification Search
USPC ................................................ 716/106–109
See application file for complete search history.

(56) References Cited

U.S. PATENT DOCUMENTS

| 7,257,789 | B2 | 8/2007 | Hosono et al. | |
|---|---|---|---|---|
| 7,421,674 | B2 | 9/2008 | Nishida | |
| 7,546,567 | B2 | 6/2009 | Cheon et al. | |
| 7,797,658 | B2 | 9/2010 | Chen et al. | |
| 2003/0182634 | A1* | 9/2003 | Chang et al. | 716/1 |
| 2006/0107244 | A1 | 5/2006 | Yonezawa | |
| 2010/0050141 | A1 | 2/2010 | Kanno | |
| 2011/0025391 | A1 | 2/2011 | Amrutur et al. | |
| 2011/0066990 | A1 | 3/2011 | Ono | |
| 2012/0047477 | A1* | 2/2012 | Kalafala et al. | 716/108 |

OTHER PUBLICATIONS

Use of Statistical Timing Analysis on Real Designs, A. Nardi, E. Tuncer, S. Naidu, A. Antonau, S. Gradinaru, T. Lin, J. Song Magma Design Automation—Santa Clara, California anardi,emre,srinath,aantonau,sgradina,tao,jhsong@magma-da.com.

* cited by examiner

*Primary Examiner* — Binh Tat
(74) *Attorney, Agent, or Firm* — Yuanmin Cai

(57) ABSTRACT

The present invention relates to a method and an apparatus for estimating a clock skew. The method comprises: obtaining a basic clock skew of each clock tree in the circuit; judging whether two units are in a same clock domain; if they are in different clock domains, estimating the clock skew between units to be a larger one of basic clock skews of the clock trees corresponding to these two unit; if these two units are in the same clock domain, further judging whether they are in a same hierarchical logic block; if they are in different hierarchical logic blocks, estimating the clock skew between units to be the basic clock skew of the clock tree of these two units plus additional clock skew caused by different hierarchical logic blocks. The apparatus is corresponding to the method. With the method and apparatus, the clock skew in the circuit can be estimated more accurately, which improves the efficiency of circuit design.

14 Claims, 5 Drawing Sheets

ESTIMATING CLOCK SKEW

CROSS-REFERENCE TO RELATED APPLICATION

The present application claims the benefit of priority of a Chinese Patent Application Serial Number 201110254111.1, filed on Aug. 30, 2011 with the State Intellectual Property Office (SIPO) of the People's Republic of China, the content of which is incorporated herein by reference in its entirety.

TECHNICAL FIELD OF THE INVENTION

The invention relates generally to ASIC design field, and particularly relates to method and apparatus for estimating clock skew in ASIC design process.

BACKGROUND

In typical ASIC (Application-Specific Integrated Circuit) design process, designers firstly divide a circuit into a plurality of modules according to the needed functions of the chip circuit, and realize each module using various logic units. Those logic units can be all kinds of connectors, logic gates, registers, and so on. Generally, the connect relations among those logic units are recorded in a netlist file. According to the records in the netlist, designers can perform the primary physical placement for each logic unit.

From the viewpoint of time sequence, the logic units recorded in the netlist include combinational logic units and sequential logic units. For combinational logic units, such as all kinds of logic gates, the operating status only depends on the present inputs, not related with the history status and sequence, while sequential logic units, such as registers and latches, need clock sequence to maintain and record their previous status. Accordingly, sequential logic units have clock pins to receive clock input. In order to provide each sequential logic unit with needed clock input, a clock tree is designed for sequential logic units to show the path from the original clock source to the target sequential logic units. Generally, a clock tree consists of PLLs (Phase-Locked Loops) as clock frequency doublers and buffers for driving sequential logic units.

Then, the designed clock tree is inserted into the circuit design, and the physical placement is further adjusted accordingly. And then, clock adjustment is performed on the circuit. Finally, on the basis of timing clean, physical layout is performed, and the circuit design is finished.

In the above process of designing and inserting the clock tree, clock skew is the key point to consider. As above described, all sequential logic units of the circuit need clock signal; however the time of the clock signal arriving at different sequential logic units is different because the path from the clock source to each sequential logic unit is different. Such time difference is also called a clock skew. There are various factors leading to the clock skew, including the path length difference among different units, the load number and size difference, the difference caused by OCV (on-chip variation), etc. OCV includes manufacturing technical variation, operational voltage variation, ambient temperature variation, etc.

Ideally, in the process of designing the clock tree, the clock skew should be estimated considering all factors related to the clock, in order to obtain the clock tree with the least skew. When the clock tree is inserted, the placement can be adjusted using placement assistant tool (e.g. PDS) based on the estimated clock skew, so as to further decrease the clock skew, and finally make the sequential timing clean. Therefore, it is very important to estimate the clock skew accurately.

In the existing techniques, the clock skew is generally estimated by the designers according to the number and the position of the sequential logic units in the logic tree, or estimated using clock estimation tools. Estimation tools estimate the clock skew mainly according to factors such as buffer type, buffer fan out, chip size, etc. However, the above estimation methods are still insufficient. First, the estimation result is not accurate enough because of failing to considering all factors. Besides, the above methods usually provide a global skew value as the clock skew of a clock tree, wherein the global skew is generally the signal arriving time difference between two units which have the largest clock path difference. Obviously, such global skew cannot accurately represent the clock difference between any two units. Because of the above reasons, the clock skew estimation for each sequential logic unit in the circuit is usually not accurate, resulting in over-estimation or under-estimation. The under-estimation of clock skew will leave large sequence defect to correct after inserting the clock tree; while the over-estimation of clock skew will make placement assistant tools do excessive optimization work in order to decrease clock skew, which increases unnecessary consumption. Therefore, an optimized approach is expected to estimate the clock skew more accurately, and further improve the efficiency of ASIC design.

SUMMARY

In view of the above problems, this invention is proposed to provide a method and an apparatus for estimating a clock skew, which will overcome at least one shortage of the existing techniques and estimate the clock skew among the sequential logic units in the circuit more accurately.

According to one aspect of the invention, a method for estimating a clock skew is provided. The method includes: obtaining a basic clock skew of at least one clock tree in a circuit; judging whether a first logic unit and a second logic unit in the circuit are in a same clock domain; in response to that the first logic unit and the second logic unit are in different clock domains, estimating the clock skew between the first logic unit and the second logic unit as a larger one of basic clock skews of the clock trees to which the first logic unit and the second logic unit are respectively corresponding; in response to that the first logic unit and the second logic unit are in the same clock domain, further judging whether the first logic unit and the second logic unit are in a same hierarchical logic block; in response to that the first logic unit and the second logic unit are in different hierarchical logic blocks, estimating the clock skew between the first logic unit and the second logic unit as the basic clock skew of the clock tree common to the first logic unit and the second logic unit plus an additional clock skew caused by the different hierarchical logic blocks.

According to another aspect of the invention, an apparatus for estimating a clock skew is provided, comprising: a basic skew obtaining module, configured to obtain a basic clock skew of at least one clock tree in a circuit; a clock domain judging module, configured to judge whether a first logic unit and a second logic unit in the circuit are in a same clock domain; a first estimating module, configured to, in response to that the first logic unit and the second logic unit are in different clock domains, estimate the clock skew between the first logic unit and the second logic unit as a larger one of the basic clock skews of the clock trees to which the first logic unit and the second logic unit are respectively corresponding;

a hierarchy judging module, configured to, in response to that the first logic unit and the second logic unit are in the same clock domain, judge whether the first logic unit and the second logic unit are in a same hierarchical logic block; a second estimating module, configured to, in response to that the first logic unit and the second logic unit are in different hierarchical logic blocks, estimate the clock skew between the first logic unit and the second logic unit as the basic clock skew of the clock tree common to the first logic unit and the second logic unit plus an additional clock skew caused by the different hierarchical logic blocks.

With the above method and apparatus, the clock skew among the sequential logic units in the circuit can be estimated more accurately, which improves the efficiency of circuit design.

DETAILED DESCRIPTION OF PREFERRED EMBODIMENTS

Figure 1:
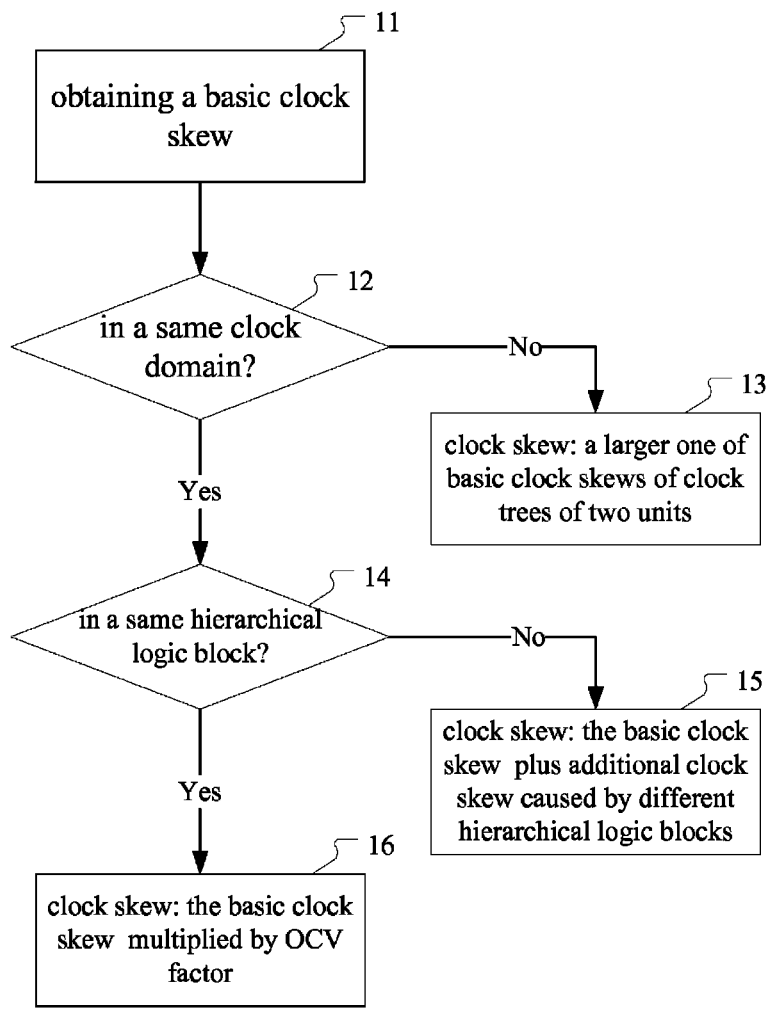
FIG. 1 is a demonstrative flowchart of a method for estimating a clock skew according to one embodiment of the invention.

The following is the detail description of the embodiments of this invention. As will be appreciated by one skilled in the art, aspects of the present invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium having computer usable program code embodied in the medium.

Any combination of one or more computer readable medium may be utilized. The computer readable medium may be computer-readable signal medium or computer-readable storage medium. The computer-readable storage medium may be, for example but not limited to, an electronic, magnetic, optical, electromagnetic, infrared, or semiconductor system, apparatus, device or any combinations thereof. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device or any proper combinations thereof. In the context of this document, a computer-readable storage medium may be any tangible medium that can contain, or store the program for use by or in connection with the instruction execution system, apparatus, or device.

Computer readable signal medium may include a propagated data signal with the computer-readable program code embodied therewith, either in baseband or as part of a carrier wave. Such propagated signal may use any proper form, including but not limited to, electromagnetic signal, optical signal, or any proper combination thereof. Computer readable signal medium may be any computer readable medium that is different from computer-readable storage medium and can communicate, propagate, or transport the program for use by or in connection with the instruction execution system, apparatus, or device.

Program code included in the computer readable medium may be transmitted using any appropriate medium, including but not limited to wireless, wireline, optical fiber cable, RF, etc. or any proper combination thereof.

Computer program code for carrying out operations of the present invention may be written in any combination of one or more programming languages, including an object oriented programming language such as Java, Smalltalk, C++ or the like and conventional procedural programming languages, such as "C" programming language or similar programming languages. The program code may execute entirely on a user computer, partly on a user computer, as a stand-alone software package, partly on user computer and partly on a remote computer or entirely on a remote computer or server. In the latter scheme, the remote computer may be connected to the user computer through any type of network, including a local area network (LAN) or a wide area network (WAN), or the connection may be made to an external computer (for example, through the Internet using an Internet Service Provider).

Below, aspects of the invention will be described with reference to flowchart and/or block diagram of methods, apparatuses (systems) and computer program products of the embodiment of the invention. Note that, each block of the flowchart and/or block diagram, and combinations of blocks in the flowchart and/or block diagram, can be implemented by computer program instructions. These computer program instructions may be provided to a processor of a general-purpose computer, a special-purpose computer or other programmable data processing apparatus to produce a machine, such that the instructions which execute on the computer or other programmable data processing apparatus create means for implementing the functions/actions specified in the block(s) of the flowchart and/or block diagram.

These computer program instructions may also be stored in a computer-readable medium that can direct a computer or other programmable data processing apparatus to function in a particular manner, such that the instructions stored in the computer-readable medium produce an article of manufacture including instruction means which implement the functions/actions specified in the block(s) of the flowchart and/or block diagram.

The computer program instructions may also be loaded into a computer or other programmable data processing apparatus to perform a series of operational steps on the computer or other programmable data processing apparatus so as to produce computer implemented process, such that the instructions which execute on the computer or other programmable data processing apparatus will provide process for implementing the functions/actions specified in the block(s) of the flowchart and/or block diagram.

Next, the invention will be described in conjunction with detailed embodiments with reference to drawings. Such description is merely for illustrative purpose and is not meant to limit the scope of the invention.

In the embodiments of this invention, after primary physical placement for each component and logic unit in the circuit is performed and a clock tree that meets the sequence requirement of the design for sequential logic units is generated, a clock skew is estimated based on clock tree information and primary placement information. In the process of estimating the clock skew, in order to obtain more accurate estimation result, based on the existing estimation techniques, the method of the embodiments of this invention further take into account of clock domain and hierarchy where logic units are located in the circuit, so as to further correct the existing estimation result based on the clock domain and hierarchy information. Therefore, the method of the embodiments of this invention can obtain more accurate estimation result of clock skew. Then, physical placement tools may receive such estimation result as sequence constraint to perform and/or optimize physical placement more accurately and efficiently. Alternatively, the estimation result can be also taken as reference to further improve the clock tree design.

FIG. 1 is a demonstrative flowchart of a method for estimating a clock skew according to one embodiment of the invention. Specifically, the flowchart can estimate the clock skew between a first logic unit and a second logic unit in the circuit. It is understood that, the above and the following the first logic unit (or first unit) and second logic unit (or second unit) refer to sequential logic units. As shown in the figure, in one embodiment, the process of estimating the clock skew comprises the following steps. Firstly, at step 11, a basic clock skew of at least one clock tree in a circuit is obtained; then, at step 12, it judges whether the first logic unit and the second logic unit in the circuit are in a same clock domain. If they are in different clock domains, it goes to step 13; if they are in the same clock domain, it goes to step 14. At step 13, the clock skew between the first unit and the second unit is estimated as a larger one of the basic clock skews of the clock trees to which the first unit and the second unit are corresponding respectively. On the other hand, at step 14, that's, in response to the two units located in the same clock domain, it further judges whether the first unit and the second unit are located in a same hierarchical logic block.

In response to the situation that the first unit and the second unit are in different hierarchical logic blocks, the process goes to step 15, wherein the clock skew between the first unit and the second unit is estimated to be the above basic clock skew of the clock tree plus additional clock skew caused by different hierarchical logic blocks. If the first unit and the second unit are in the same hierarchical logic block, the process goes to step 16, wherein the clock skew between the first unit and the second unit is estimated to be the above basic clock skew multiplied by OCV correction factor.

The following is the detail description of each of the above steps.

Firstly, the basic clock skew of respective clock tree in the circuit is obtained at step 11. Such basic clock skew can be obtained using the estimation methods and algorithms of the existing techniques. In one embodiment, a basic clock skew of a clock tree is estimated as:

$$T = \alpha S + \beta D \quad (1)$$

wherein $\alpha$ and $\beta$ are weight factors, which can be calculated based on process parameters. Specifically, the weight factors can be determined by the statistical average of the previous chip design. S is the size or spreading area of the physical span of the related sequential logic units of the clock tree. The area size can be calculated based on the primary placement of various units in the circuit. D is the path depth of the clock tree. Specifically, path depth D can be calculated using the following formula:

$$D = \log 2(N/n) \quad (2)$$

wherein N is the number of the sequential logic units involved in the clock tree, and n is the fan out of the last stage clock buffer.

Thereby, the basic clock skew of a clock tree can be estimated via the above formula (1) and (2).

The above is one of the existing methods for estimating a clock skew of a clock tree. Those skilled in the art can understand that, there are many similar existing methods for estimating the clock skew, for example, estimating path depth D using substitutive method, calculating area size S using more detail method, replacing S with physical distance between units, etc. Such estimation methods are not all listed here since they are the existing techniques. Besides, those skilled in the art can also get more estimation methods by modifying the existing estimation methods. The clock skew obtained by all of the above estimation methods can be taken as the basic clock skew used in the embodiments of this invention.

Based on the basic clock skew obtained above, the situation of cross-clock domain and cross-hierarchy among units in the circuit are further considered in the embodiments of this invention, in order to estimate clock skew more accurately.

Specifically, at step 12, it judges whether the first unit and the second unit to be estimated are in a same clock domain, that's, whether they adopt clock signals generated by a same clock generating logic. Generally, if the first unit and the second unit adopt clock signals from different clock generating logics, then they are located in different clock trees. Therefore, in one embodiment, whether different units are in the same clock domain can be judged according to clock trees. In another embodiment, the clock domain can be determined by analyzing the netlist information and judging whether the first and the second sequential logic units need the same clock signal. In one embodiment, the above methods can be also combined in the judgment at step 12. Other methods readily occurred to those skilled in the art can also be used in the judgment. It is understood that, the judgment on the clock domains of the first unit and the second unit premises that there is a talk or interaction between the first unit and the second unit. That's because, if there is no interaction between these two units, then their clocks are independent from each other, and the clock difference will not influence the circuit design. Therefore, only the interacted units need the judgment.

As the judging result of step 12, if the first unit and the second unit are not in the same clock domain, then the process goes to step 13, in which the clock skew between the first unit and the second unit is estimated. Specifically, if the first unit A and the second unit B are in different clock domains, then they are in different clock trees, for instance, clock tree A and clock tree B. It is understood that, at step 11, the basic clock skew of each clock tree has been estimated, so basic clock skews $T_A$ and $T_B$ of clock tree A and B can be obtained respectively. Then, at step 13, the clock skew between the first unit A and the second unit B is estimated to be:

$$T(A,B) = \max(T_A, T_B) \quad (3)$$

That's, if two interacted units are in different clock trees, the clock skew of these two units is estimated to be a larger one of basic clock skews of their clock trees.

In one embodiment, OCV factor f is added for further correction based on the above estimated clock skew, that's:

$$T(A,B)=\max(T_A, T_B) * f_{OCV} \quad (4)$$

Wherein $f_{OCV}$ is a parameter related to chip manufacturing technology. The parameter can be obtained through measurement and statistics on the same type of chips designed before. For example, in one embodiment, for chips of certain specification (e.g. Cu-45HP in 45 nm), $f_{OCV}$ can be estimated to be the average of {(Late_Delay−Early_Delay)/Late_Delay}.

Thereby, for two sequential logic units in different clock domains, the clock skew between them can be estimated via formula (3) or (4).

As another branch of the judging result of step 12, if the first unit and the second unit are in the same clock domain, the process goes to step 14, in which the hierarchy of the units is further judged.

It is understood that, since chip functions are more and more complex, logic blocks of various functions in the circuit are connected and managed in different hierarchies. In some cases, the above logic block is also called RLM (random logic macro). Correspondingly, the RLM to which each unit belongs and the hierarchy where each unit is located are recorded in the netlist file. Therefore, by scanning and looking up the netlist, it can judge whether the first unit and the second unit are in a same hierarchical logic block, that's, perform the judgment of step 14.

As the judging result of step 14, if the first unit and the second unit are located in different hierarchical logic blocks, the process goes to step 15, in which the clock skew between the first unit and the second unit is estimated to be the basic clock skew plus additional clock skew caused by different hierarchical logic blocks. The following is the detail description of the estimation using two examples.

Figure 2A:
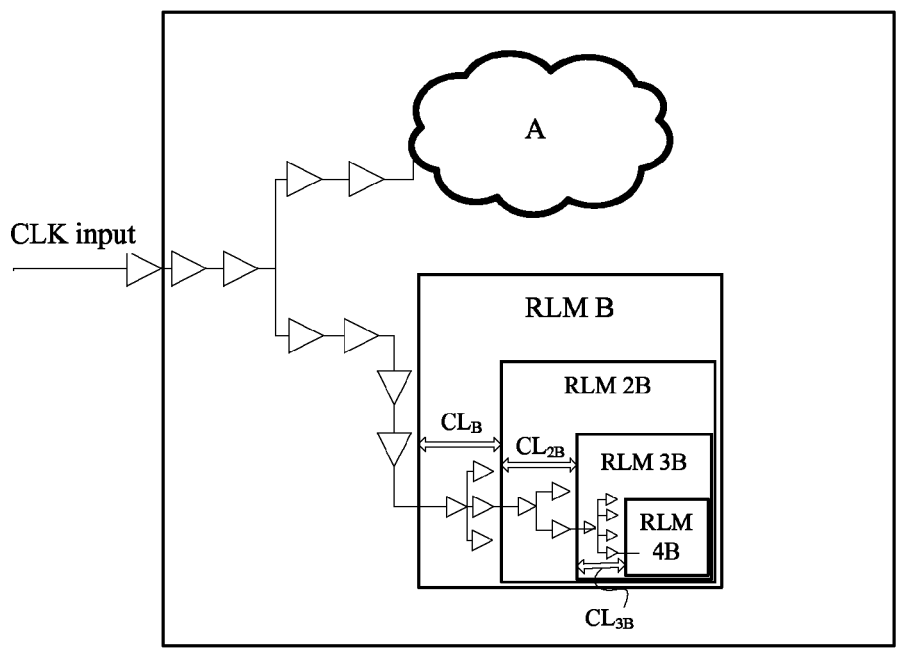
FIG. 2A is one example of circuit clock connection.

FIG. 2A is one example of circuit clock connection. In this example, the first unit A locates in the top hierarchy, while the second unit B locates in the RLM of another hierarchy, and thus the first unit and the second unit are in different hierarchical logic blocks. Specifically, RLM B is a logic block one level lower than the top hierarchy, and RLM B further contains RLM 2B, RLM 3B and RLM 4B in yet lower hierarchies in turn. The second unit B to be estimated is in RLM 4B, 4 hierarchies distant from the first unit A in the top hierarchy. For the first unit A, a clock signal from a clock source directly connects to the clock port of the first unit A after driving by various buffers. But for the second unit B, the same clock signal has to firstly enter into RLM B via the clock port, then enters into RLM 2B-4B in turn, and finally arrives at the second unit B. Therefore, the additional clock path will cause the additional clock delay.

For unit A and unit B and the clock connection shown in FIG. 2A, according to step 15 shown in FIG. 1, in one embodiment, its clock skew is estimated as:

$$T(A,B)=T+CLK(B) \quad (5)$$

Wherein T is the basic clock skew of the common clock tree shared by unit A and unit B calculated at step 11. Usually, such basic clock skew corresponds to the clock skew estimated for the top hierarchy logic of multiple-hierarchy circuit. CLK(B) is the additional clock skew caused by the hierarchy difference between unit B and the top hierarchy logic block. Specifically, in one example, CLK(B) can be obtained by calculating additional clock path in RLM B from top to bottom, that's:

$$CLK(B)=CL_B+CL_{2B}+CL_{3B} \quad (6)$$

wherein $CL_{iB}$ is the clock delay caused by the path from RLM iB to RLM (i+1)B, as shown in FIG. 2A.

More generally, for a unit in the logic block which is n hierarchies distant from the top hierarchy, the additional clock skew caused by hierarchy difference between the unit and the top hierarchy logic block can be presented as:

$$CLK=\Sigma_{i=1}^{n} CL_i \quad (7)$$

Wherein $CL_i$ is the clock delay caused by the path from the ith hierarchy logic block to the (i+1)th hierarchy logic block.

In one embodiment, $CL_i$ is calculated by estimating a path length from the ith hierarchy logic block to the (i+1)th hierarchy logic block. In one example, $CL_i$ is calculated by further taking into account of the load information (e.g. buffers) in the path from the ith hierarchy logic block to the (i+1)th hierarchy logic block. In another example, $CL_i$ is further corrected by considering a clock delay caused by the clock signal entering into each RLM clock port. It is understood that those skilled in the art can also adopt other methods for calculating CLi caused by the clock path from the ith hierarchy logic block to the (i+1)th hierarchy logic block according to accuracy needs, and thereby obtain CLK.

For the above second unit B, CLK(B) can be obtained according to the above calculation to show the influence of path difference passed by clock signals between unit B and the top hierarchy. Therefore, via formula (5) and (6), the clock skew estimation can be improved by taking into account of the additional clock skew caused by logic block hierarchy difference.

In one embodiment, OCV factor can be also introduced to further correct the above result, that's:

$$T(A,B)=\{T+CLK(B)\} * f_{OCV},$$

Wherein the definition of $f_{OCV}$ is the same with that in formula (4).

Figure 2B:
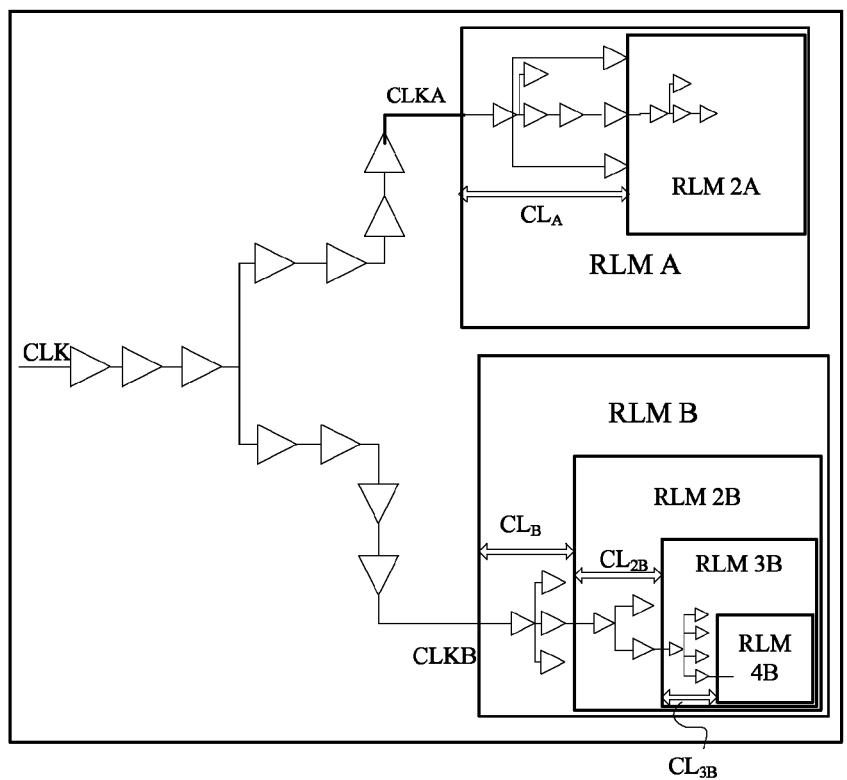
FIG. 2B is another example of circuit clock connection.

FIG. 2B is another example of circuit clock connection. In this example, the first unit A locates in RLM 2A which is contained in RLM A, while the second unit B locates in RLM 4B which is 4 hierarchies distant from the top hierarchy, the same as FIG. 2A. Therefore, neither of the first unit A and the second unit B is in the top hierarchy, but they are located in different hierarchy logic blocks from each other. A clock signal from a same clock source enters into RLM in each hierarchy in turn via respective clock ports, and then connects to the clock inputs of unit A and unit B respectively. For unit A and unit B and the clock connection shown in FIG. 2B, according to step 15 in FIG. 1, in one embodiment, the clock skew is estimated as:

$$T(A,B)=T+\max\{CLK(A),CLK(B)\} \quad (8)$$

Wherein T is the basic clock skew of the common clock tree shared by unit A and unit B, CLK(A) and CLK(B) are the additional clock skews caused by the block hierarchy difference between unit A and the top hierarchy, and between unit B and the top hierarchy, respectively. In one embodiment, using formula (7), CLK(A) and CLK(B) can be obtained by calculating the additional clock path from top to bottom, that's:

$$CLK(A)=CL_A+CL_{2A}+$$

$$CLK(B)=CL_B+CL_{2B}+CL_{3B} \quad (9)$$

Wherein the additional paths corresponding to $CL_{iA}$ and $CL_{iB}$ are shown in FIG. 2B.

Since there is no common path inside different RLMs, the larger one of CLK(A) and CLK(B) can be seen as the additional clock skew caused by logic block hierarchy difference, and thereby the clock skew estimation is improved.

In one example, OCV factor can be also introduced to further correct the above result, that's:

$$T(A,B)=\{T+\max\{CLK(A),CLK(B)\}\}*f_{OCV}$$

Wherein the definition of $f_{OCV}$ is the same with that in formula (4).

The method for estimating the clock skew between units is described in connection with two typical examples when the first unit and the second unit are in different hierarchical logic block. It can be seen that when estimating the clock skew, step 15 in the method of the embodiments also takes into account of additional clock skew caused by logic block hierarchy difference. More particularly, the above method considers clock path difference corresponding to the logic block hierarchy difference between the units and the top hierarchy, based on which the additional clock skew caused by logic block hierarchy difference is estimated.

As another branch of the judging result of step 14, if the judging result is "yes", the flow in FIG. 1 goes to step 16. In other words, if the first unit and the second unit are in a same clock domain and in a same hierarchical logic block, the clock skew between these two units is estimated at step 16. Specifically, in this case, there is no clock skew caused by clock domain difference and logic block hierarchy difference between the first unit and the second unit, and thus the basic clock skew obtained at step 11 can represent the clock skew between these two units. In one embodiment, OCV factor is introduced to correct the result at step 11, that's, T (A, B)=T*$f_{OCV}$, wherein the definition of $f_{OCV}$ is the same as formula (4).

Thereby, with the method shown in FIG. 1, by further taking into account of the influence of clock domain and circuit hierarchy, the clock skew estimation is improved. The following is the comparison between the above estimation result and the existing estimation result in connection with several examples.

Figure 3A:
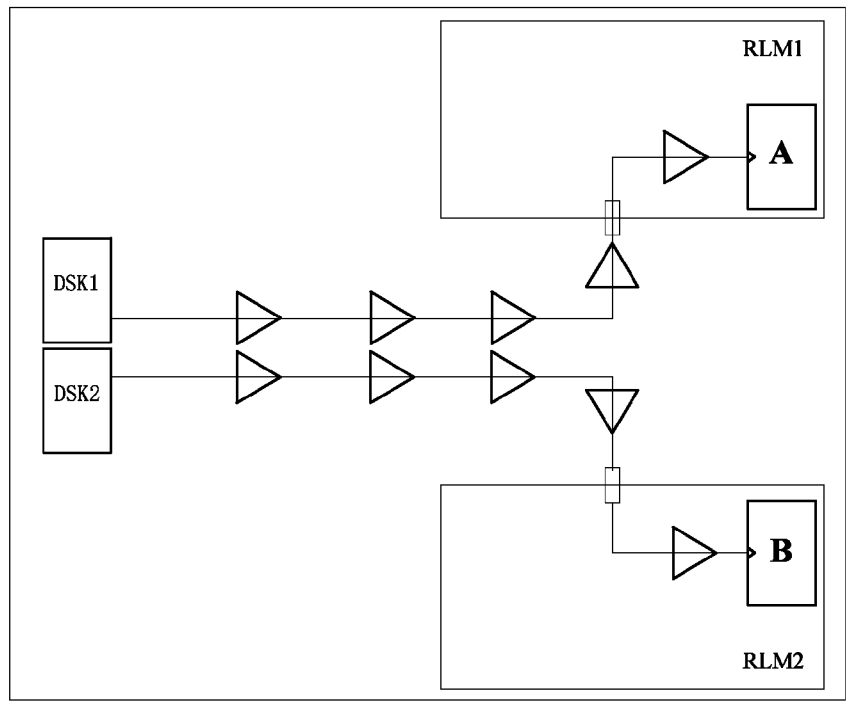
FIG. 3A is one example of circuit clock path.

FIG. 3A is one example of circuit clock path. In this example, sequential unit A locates in RLM1 and unit B locates in RLM2, receiving clock signals separately from clock generating logics DSK1 and DSK2. That's, unit A and unit B are in different clock domains. However, according to the existing techniques, the estimation tools can't realize cross clock domain problem, only estimate clock skew based on physical placement and path length, and therefore give the wrong result that there is little clock skew between unit A and unit B. Usually, such wrong result cannot be corrected until the clock tree is inserted and timing sequence is adjusted. In this case, designers need to perform the placement and insert the clock tree again, which reduces the development efficiency.

Figure 3B:
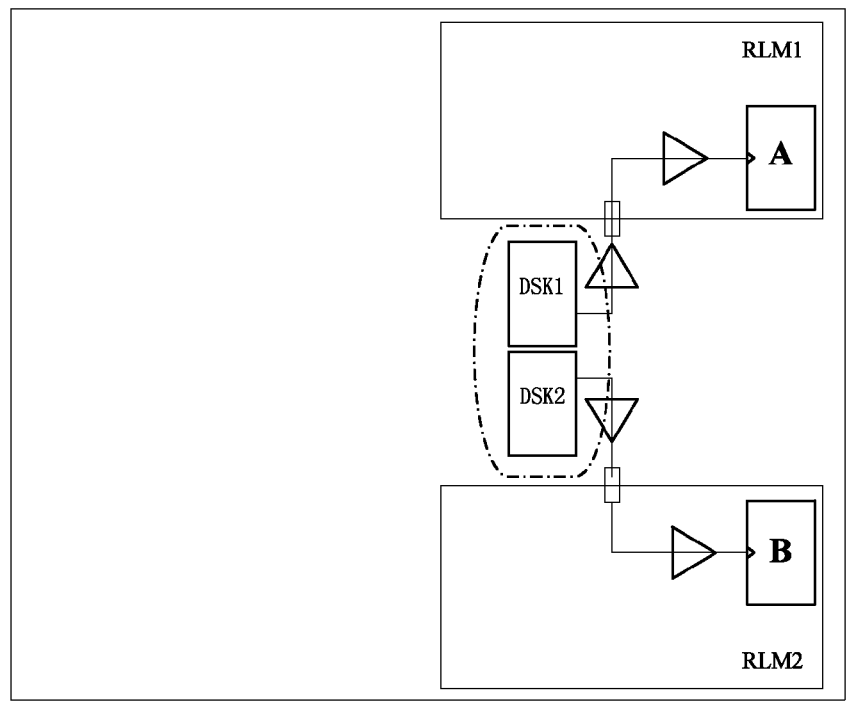
FIG. 3B is one example of improvement on the circuit clock path shown in FIG. 3A.

According to the embodiments of this invention, the large clock skew between unit A and unit B can be exactly estimated by taking into account of the clock domain difference between these two units. The exact estimation of clock skew makes designers find and solve problems earlier. For example, designers can improve the clock settings, as shown in FIG. 3B. It can be seen that, by moving the two clock generating logics DSK1 and DSK2 to positions nearer to RLM clock ports, the clock skew between unit A and unit B can be decreased. Therefore, clock skew problems can be found and solved before clock tree is inserted, which saves the time and improves the efficiency.

Figure 4A:
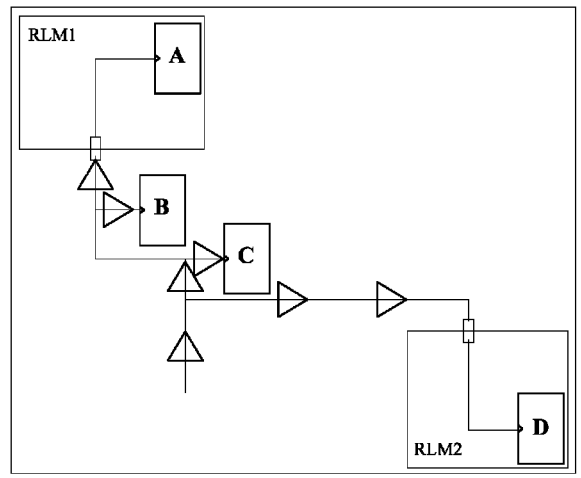
FIG. 4A is another example of circuit clock path.

FIG. 4A is another example of circuit clock path. In this example, the circuit contains four sequential logic units A, B, C and D (e.g. registers), wherein A and D locate in RLM1 and RLM2 respectively, while B and C locate in the top hierarchy. According to the existing techniques, estimation tools can't realize the hierarchy difference in the circuit, and therefore believes that the clock skew of all these four units meet requirements.

Figure 4B:
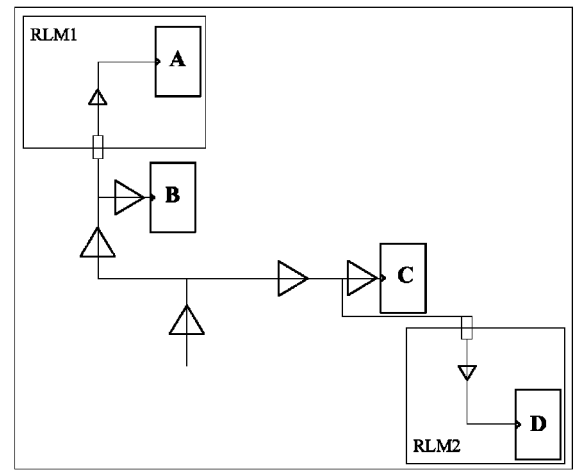
FIG. 4B is one example of improvement on the circuit clock path shown in FIG. 4A.

However, according to the embodiments of this invention, by taking into account of hierarchy influence, it can estimate that there are relative large clock skews between unit A and B, and between unit C and D. Such estimation result can be input into placement assistant tools. Then, placement assistant tools can adjust the placement, in order to decrease the clock skew between A and B, and C and D, as much as possible. For example, in one example, the placement can be improved as shown in FIG. 4B. In FIG. 4B, unit B is placed nearer to RLM1, and unit C is placed nearer to RLM2, thereby decreasing the clock skews between A and B, and between C and D. Therefore, based on the clock skew correctly estimated with the embodiments of this invention, the placement can be better adjusted and the circuit design with timing clean can be obtained.

In summary, based on the existing estimation result, the estimation method according to the embodiments of this invention can take into account of additional clock skew caused by clock domain and circuit hierarchy, and thus estimate the clock skew more accurately so as to find and correct the sequence problems caused by clock skew.

Figure 5:
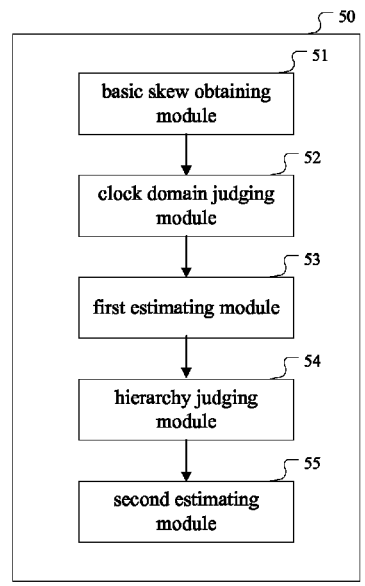
FIG. 5 is a block diagram of an apparatus for estimating clock skew according to one embodiment of the invention.

Based on a same conception, this invention also provides an apparatus for estimating a clock skew. FIG. 5 is a block diagram of the apparatus for estimating a clock skew according to one embodiment of the invention. As shown in FIG. 5, the apparatus is indicated using 50 generally. Specifically, apparatus 50 comprises: a basic skew obtaining module 51, configured to obtain a basic clock skew of at least one clock tree in the circuit; a clock domain judging module 52, configured to judge whether a first logic unit and a second logic unit in the circuit are in a same clock domain; a first estimating module 53, configured to, in response to that the first logic unit and the second logic unit are in different clock domains, estimate their clock skew as a larger one of the basic clock skews of the clock trees to which the first logic unit and the second logic unit are corresponding respectively; a hierarchy judging module 54, configured to judge whether the first logic unit and the second logic unit are in a same circuit hierarchical logic block; and a second estimating module 55, configured to, in response to that the first logic unit and the second logic unit are in different hierarchical logic blocks, estimate their clock skew as the basic clock skew of the clock tree plus additional clock skew caused by different hierarchical logic blocks.

In one embodiment, the above-mentioned basic clock skew depends on the placement of sequential logic units contained in the clock tree and the path depth of the clock tree.

In one embodiment, the clock domain judging module and hierarchy judging module execute the judgment by referring to a netlist of the circuit.

In one embodiment, the first logic unit locates in a logic block of top hierarchy, and the second logic unit locates in a logic block that is n hierarchies from the top hierarchy. In this case, the above-mentioned additional clock skew caused by different hierarchy logic blocks is the clock skew caused by the hierarchy difference between the second logic unit and the top hierarchy logic block.

In one embodiment, the first logic unit and the second logic unit locate in logic blocks that are m and n hierarchies from the top hierarchy, respectively. In this case, the above-mentioned additional clock skew caused by different hierarchy logic blocks is a larger one of clock skews caused by the hierarchy difference between the first logic unit and the top hierarchy, and between the second logic unit and the top hierarchy.

In one embodiment, formula $CLK=\Sigma_{i=1}^{n}CL_i$ is used to calculate the clock skew caused by the hierarchy difference between each unit and the top hierarchy, wherein $CL_i$ is clock delay caused by the clock path from the ith hierarchy logic block to the (i+1)th hierarchy logic block. In one embodiment, the above $CL_i$ can be estimated according to at least one of the following: a path length from the ith hierarchy logic block to (i+1)th hierarchy logic block; loads in a path from the ith hierarchy logic block to (i+1)th hierarchy logic block; a clock delay caused by a clock path passing through the clock port of each hierarchy logic block.

In one embodiment, the first estimating module and the second estimating module are further configured to correct the estimated clock skew by introducing OCV factor.

The detail execution of each module is the same with the description of FIG. 1, and thus is not described again.

The above described apparatus 50 for estimating the clock skew can be integrated into the existing tools, such as the existing clock skew estimation tools, placement assistant tools (e.g. PDS), and so on, or can be implemented as a separate tool or device.

Figure 6:
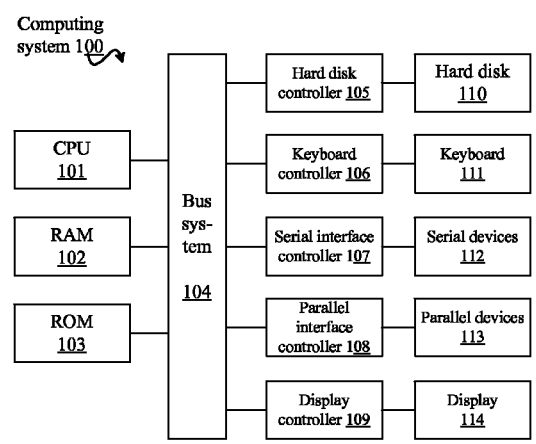
FIG. 6 is a block diagram of an exemplary computing system for realizing embodiments of the invention.

Besides, the above described method and apparatus for estimating clock skew can be realized by computing system. FIG. 6 is a block diagram of the exemplary computing system 100 for realizing the embodiments of the invention. As shown, the computer system 100 may comprise: a CPU (Central Processing Unit) 101, a RAM (Random Access Memory) 102, a ROM (Read-Only Memory) 103, a system bus 104, a hard disk controller 105, a keyboard controller 106, a serial interface controller 107, a parallel interface controller 108, a display controller 109, a hard disk 110, a keyboard 111, a serial external device 112, a parallel external device 113 and a display 114. Among these devices, the system bus 104 couples to the CPU 101, the RAM 102, the ROM 103, the hard disk controller 105, the keyboard controller 106, the serial controller 107, the parallel controller 108 and the display controller 109. The hard disk is coupled to the hard disk controller 105, the keyboard 111 is coupled to the keyboard controller 106, the serial external device 112 is coupled to the serial interface controller 107, the parallel external device 113 is coupled to the parallel interface controller 108, and the display 114 is coupled to the display controller 109. It is appreciated that, the structural block diagram shown in FIG. 6 is merely for purpose of illustration, rather than being a limitation to the scope of the invention. In some circumstances, certain devices may be added or removed based on actual condition.

The flowcharts and block diagrams in the accompany drawing illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although respective apparatus and method of the present invention have been described in detail in conjunction with specific embodiments, the present invention is not limited thereto. Under teaching of the specification, various changes, replacements and modifications may be made to the invention by those skilled in the art without departing from the spirit and scope of the invention. It is appreciated that, all such changes, replacements and modifications still fall within the protection scope of the invention. The scope of the invention is defined by the appended claims.

The invention claimed is:

1. A method for estimating a clock skew, comprising:

obtaining a basic clock skew of at least one clock tree in a circuit;

judging whether a first logic unit and a second logic unit in the circuit are in a same clock domain;

in response to that the first logic unit and the second logic unit are in different clock domains, using a computer in estimating the clock skew between the first logic unit and the second logic unit as a larger one of basic clock skews of clock trees to which the first logic unit and the second logic unit are respectively corresponding;

in response to that the first logic unit and the second logic unit are in the same clock domain, further judging whether the first logic unit and the second logic unit are in a same hierarchical logic block;

in response to that the first logic unit and the second logic unit are in different hierarchical logic blocks, using a computer in estimating the clock skew between the first logic unit and the second logic unit as the basic clock skew of a clock tree common to the first logic unit and the second logic unit plus an additional clock skew caused by the different hierarchical logic blocks, wherein the first logic unit locates in a logic block of top hierarchy, and the second logic unit locates in a logic block that is n hierarchies distant from the logic block of top hierarchy, said additional clock skew caused by the different hierarchical logic blocks is a clock skew caused by the hierarchy difference between the second logic unit and the logic block of top hierarchy and wherein formula $CLK=\Sigma_{i=1}^{n}CL_i$ is used to calculate the clock skews caused by the hierarchy difference between the logic units and the top hierarchy, wherein $CL_i$ is a clock delay caused by a clock path from the ith hierarchy logic block to the (i+1)th hierarchy logic block.

2. The method of claim 1, wherein said basic clock skew relates to a placement of sequential logic units contained in the clock tree and a path depth of the clock tree.

3. The method of claim 1, wherein said judging whether the first logic unit and the second logic unit in the circuit are in the same clock domain and judging whether the first logic unit and the second logic unit are in the same hierarchical logic blocks are both executed by referring to a netlist of the circuit.

4. The method of claim 1, wherein $CL_i$ can be estimated according to at least one of the following: a path length from the ith hierarchy logic block to the (i+1)th hierarchy logic block; loads in the path from the ith hierarchy logic block to the (i+1)th hierarchy logic block; a clock delay caused by a clock path passing through clock ports of various hierarchy logic blocks.

5. The method of claim 1, further comprising, introducing OCV factor to correct the estimated clock skew.

6. An apparatus for estimating a clock skew, comprising:
- a basic skew obtaining module, configured to obtain a basic clock skew of at least one clock tree in a circuit;
- a clock domain judging module, configured to judge whether a first logic unit and a second logic unit in the circuit are in a same clock domain;
- a first estimating module, configured to, in response to that the first logic unit and the second logic unit are in different clock domains, estimate the clock skew between the first unit and the second unit as a larger one of basic clock skews of clock trees to which the first logic unit and the second logic unit are respectively corresponding;
- a hierarchy judging module, configured to, in response to that the first logic unit and the second logic unit are in the same clock domain, judge whether the first logic unit and the second logic unit are in a same hierarchical logic block;
- a second estimating module, configured to, in response to that the first logic unit and the second logic unit are in different hierarchical logic blocks, estimate the clock skew between the first logic unit and the second logic unit as the basic clock skew of the clock tree common to the first logic unit and the second logic unit plus an additional clock skew caused by the different hierarchical logic blocks,
- wherein the first logic unit and the second logic unit locate respectively in logic blocks that are m and n hierarchies distant from a top hierarchy, said additional clock skew caused by the different hierarchical logic blocks is a larger one of the clock skews respectively caused by the hierarchy difference between the first logic unit and the top hierarchy, and between the second logic unit and the top hierarchy and
- wherein formula $CLK=\Sigma_{i=1}^{n}CL_i$ is used to calculate the clock skew caused by the hierarchy difference between the logic units and the top hierarchy, wherein $CL_i$ is a clock delay caused by a clock path from the ith hierarchy logic block to the (i+1)th hierarchy logic block.

7. The apparatus of claim 6, wherein said basic clock skew relates to a placement of sequential logic units contained in the clock tree and a path depth of the clock tree.

8. The apparatus of claim 6, wherein the clock domain judging module and the hierarchy judging module perform judgment by referring to a netlist of the circuit.

9. The apparatus of claim 6, wherein m=0 and the first logic unit locates in a logic block of the top hierarchy and there is no hierarchy difference, and clock skew caused thereby, between the first logic unit and the top hierarchy.

10. The apparatus of claim 6, wherein $CL_i$ can be estimated according to at least one of the following: a path length from the ith hierarchy logic block to the (i+1)th hierarchy logic block; loads in a path from the ith hierarchy logic block to the (i+1)th hierarchy logic block; a clock delay caused by a clock path passing through clock ports of various hierarchy logic block.

11. The apparatus of claim 6, wherein said first estimating module and said second estimating module are further configured to introduce OCV factor to correct the estimated clock skew.

12. A method for estimating a clock skew, comprising:
- obtaining a basic clock skew of at least one clock tree in a circuit;
- judging whether a first logic unit and a second logic unit in the circuit are in a same clock domain;
- in response to that the first logic unit and the second logic unit are in different clock domains, using a computer in estimating the clock skew between the first logic unit and the second logic unit as a larger one of basic clock skews of clock trees to which the first logic unit and the second logic unit are respectively corresponding;
- in response to that the first logic unit and the second logic unit are in the same clock domain, further judging whether the first logic unit and the second logic unit are in a same hierarchical logic block;
- in response to that the first logic unit and the second logic unit are in different hierarchical logic blocks, using a computer in estimating the clock skew between the first logic unit and the second logic unit as the basic clock skew of a clock tree common to the first logic unit and the second logic unit plus an additional clock skew caused by the different hierarchical logic blocks,
- wherein the first logic unit and the second logic unit locate respectively in logic blocks that are m and n hierarchies distant from a top hierarchy, said additional clock skew caused by the different hierarchical logic blocks is a larger one of clock skews respectively caused by the hierarchy difference between the first logic unit and the top hierarchy, and between the second logic unit and the top hierarchy and
- wherein formula $CLK=\Sigma_{i=1}^{n}CL_i$ is used to calculate the clock skews caused by the hierarchy difference between the logic units and the top hierarchy, wherein $CL_i$ is a clock delay caused by a clock path from the ith hierarchy logic block to the (i+1)th hierarchy logic block.

13. The method of claim 12, wherein $CL_i$ can be estimated according to at least one of the following: a path length from the ith hierarchy logic block to the (i+1)th hierarchy logic block; loads in a path from the ith hierarchy logic block to the (i+1)th hierarchy logic block; a clock delay caused by a clock path passing through clock ports of various hierarchy logic blocks.

14. The method of claim 12, wherein m=0 and the first logic unit locates in a logic block of the top hierarchy and there is no hierarchy difference, and clock skew caused thereby, between the first logic unit and the top hierarchy.

* * * * *